US008718625B2

(12) United States Patent
Zhang et al.

(10) Patent No.: US 8,718,625 B2
(45) Date of Patent: May 6, 2014

(54) MOBILE TERMINAL AND METHOD FOR UPDATING INFORMATION OF CONTACTS

(75) Inventors: Benquan Zhang, Guangdong Province (CN); Qinbo Huang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 36 days.

(21) Appl. No.: 13/508,948

(22) PCT Filed: Jul. 19, 2010

(86) PCT No.: PCT/CN2010/075257
§ 371 (c)(1),
(2), (4) Date: May 9, 2012

(87) PCT Pub. No.: WO2011/130958
PCT Pub. Date: Oct. 27, 2011

(65) Prior Publication Data
US 2012/0231775 A1     Sep. 13, 2012

(30) Foreign Application Priority Data
Apr. 20, 2010   (CN) .......................... 2010 1 0154190

(51) Int. Cl.
*H04M 3/42*      (2006.01)
(52) U.S. Cl.
USPC .......... 455/415; 455/418; 455/558; 379/88.2; 379/142.06
(58) Field of Classification Search
USPC ........................................ 455/418, 558, 415
See application file for complete search history.

(56) References Cited

U.S. PATENT DOCUMENTS

2006/0035632 A1*   2/2006   Sorvari et al. ................. 455/418
2010/0120453 A1*   5/2010   Tamchina et al. ............. 455/466

FOREIGN PATENT DOCUMENTS

CN    101188638    5/2008
CN    101605168    12/2009

OTHER PUBLICATIONS

International Search Report and corresponding English Translation from International Application No. PCT/CN2010/075257 dated Jan. 20, 2011.

* cited by examiner

*Primary Examiner* — Khalid Shaheed
(74) *Attorney, Agent, or Firm* — Workman Nydegger

(57) ABSTRACT

A mobile terminal and a method for updating information of contacts is provided, and the mobile terminal includes: an edition module, configured to provide a contact update interface containing a selection control and an edition control, wherein the selection control is used for generating a selection instruction according to an operation from a user, and the edition control is used for generating an edition instruction according to an operation from the user; a control module, configured to select information of multiple contacts according to the selection instruction from the selection control and edit the information of the multiple contacts according to the edition instruction from the edition control; and an update module, configured to update information of the multiple contacts stored in a database as the information of the multiple contacts being edited by the control module. Advantageously, the effect of improving user experience is reached.

12 Claims, 4 Drawing Sheets

MOBILE TERMINAL AND METHOD FOR UPDATING INFORMATION OF CONTACTS

The present application is a U.S. Nationalization of PCT International Application Application No. PCT/CN2010/ 075257, entitled "MOBILE TERMINAL AND METHOD FOR UPDATING CONTACT PERSON INFORMATION", filed on Jul. 19, 2010, which claims priority of Chinese patent application No. 201010154190.4, filed on Apr. 20, 2010. The preceding applications are each incorporated herein by reference in their entirety.

FIELD OF THE INVENTION

The present invention relates to the communication field, and in particular to a mobile terminal and a method for updating information of contacts.

BACKGROUND OF THE INVENTION

Telephone book is a basic application in mobile terminals such as mobile phones and so on. When people use the telephone book application, they often encounter the situation of updating contact ways, and the new contact ways of a contact may come from a new address book or short message notification. If other people directly call the phone of the user to notify him/her, then the new contact way will generally be stored in the call records application.

Currently, the update operation of the telephone book application in the mobile terminal can only update one contact each time. When it needs to update many contacts, the user needs to continuously select the edit menu entry in the menu or continuously click the edit button on the interface to complete a large amount of operations of updating the contacts, and such update mode is a cumbersome process and brings lots of inconvenience to the user.

Except for directly updating the contacts in the telephone book, applications such as call records, short messages, multimedia messages and so on may also contain the new numbers of the contacts. Currently, applications such as call records and so on in some smart mobile terminals possess the function of updating the contacts in the telephone book. However, the inventors have found that only one contact can be updated each time, and when there are many un-updated contact numbers in applications such as call records and so on, it is also a cumbersome process to update one by one.

SUMMARY OF THE INVENTION

The present invention provides a mobile terminal and a method for updating information of contacts so as to solve the problem in the related art that the operation is relatively cumbersome when updating, in the mobile terminal, a plurality of numbers once and the user experience is affected.

In order to achieve the above object, a mobile terminal is provided according to one aspect of the present invention. This mobile terminal includes: an edition module, configured to provide a contact update interface containing a selection control and an edition control, wherein the selection control is used for generating a selection instruction according to an operation from a user, and the edition control is used for generating an edition instruction according to an operation from the user; a control module, configured to select information of multiple contacts according to the selection instruction from the selection control and edit the information of the multiple contacts according to the edition instruction from the edition control; and an update module, configured to update information of the multiple contacts stored in a database as the information of the multiple contacts being edited by the control module.

Furthermore, the mobile terminal further includes: a trigger module, configured to receive an instruction from the user and trigger the edition module to provide the contact update interface.

Furthermore, the edition module is further configured to provide an interaction control in the contact update interface, wherein the interaction control is used for generating an instruction for reading call records according to an operation from the user; the control module is further configured to acquire information of contacts in the call records corresponding to the information of the contacts according to the instruction for reading the call records from the interaction control; and the edition module is further configured to provide the information of the contacts acquired by the control module in the contact update interface and set a selected function for the acquired information of the contacts.

Furthermore, the edition module is further configured to provide a mode control in the contact update interface, wherein the mode control is used for accepting the user to designate the number of contacts to be updated; and the control module is further configured to stop updating the information of the multiple contacts when the number of the multiple contacts whose information is updated is equal to the number of the contacts to be updated designated by the user.

Furthermore, the database includes: an internal memory of the mobile terminal and/or a subscriber identity module (SIM) card.

In order to achieve the above object, a method for updating information of contacts is provided according to another aspect of the present invention, and the method includes: a mobile terminal receiving a selection instruction generated by an operation of a user in a contact update interface and selecting information of multiple contacts according to the selection instruction; generating an edition instruction according to an operation of the user received by the contact update interface and editing the information of the multiple contacts according to the edition instruction; and updating information of the multiple contacts stored in a database as the edited information of the multiple contacts.

Furthermore, before the mobile terminal receives the selection instruction generated by an operation of the user in the contact update interface, the method further includes: the mobile terminal receiving an instruction from the user and triggering the mobile terminal to provide the contact update interface.

Furthermore, after selecting information of the multiple contacts according to the selection instruction, the method further includes: the mobile terminal receiving a reading instruction generated by an operation of the user in the contact update interface; and acquiring information of contacts in call records corresponding to the information of the multiple contacts according to the reading instruction and providing the acquired information of the contacts to the user via the contact update interface so that the user edits the information of the multiple contacts according to the acquired information of the contacts.

Furthermore, the method further includes: before the mobile terminal receives the selection instruction generated by an operation of the user in the contact update interface, the mobile terminal accepting the user to designate the number of contacts to be updated; and after updating information of the multiple contacts stored in a database as the edited information of the multiple contacts, stopping updating the information of the contacts if it is judged that the number of the contacts whose information is updated is equal to the number of the contacts to be updated designated by the user.

Furthermore, the database includes: an internal memory of the mobile terminal and/or a subscriber identity module (SIM) card.

According to the present invention, an edition module is used to provide a control to receive an operation from the user so as to generate a selection instruction or an edition instruction, a control module edits information of contacts in batch according to the edition instruction, an update module updates the information of the contacts in a database edited by the control module, which solves the problem in the related art that the operation is relatively cumbersome when updating, in the mobile terminal, a plurality of numbers once and the user experience is affected, thus achieving the effects of simplifying the procedure of updating information of contacts and improving user experience.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

It needs to note that the embodiments of the present application and the features in the embodiments can be combined with each other if there is no conflict. The present invention is described in detail with reference to the accompanying drawings and in combination with the embodiments in the following.

Figure 1:
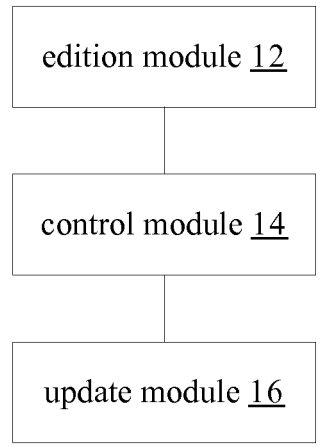
FIG. 1 is a structural block diagram of a mobile terminal according to an embodiment of the present invention.

FIG. 1 is a structural block diagram of a mobile terminal according to an embodiment of the present invention, and the mobile terminal includes: an edition module 12, configured to provide a contact update interface containing a selection control and an edition control, wherein the selection control is used for generating a selection instruction according to an operation from a user, and the edition control is used for generating an edition instruction according to an operation from the user; a control module 14, coupled with the edition module 12, configured to select information of multiple contacts according to the selection instruction from the selection control and edit the information of the multiple contacts according to the edition instruction from the edition control; and an update module 16, coupled with the control module 14, configured to update information of the multiple contacts stored in a database as the information of the multiple contacts being edited by the control module 14.

In the related art, only one number can be updated each time, however, in this embodiment, the edition module is used to provide a control to receive an operation from the user so as to generate a selection instruction or an edition instruction, the control module edits the information of multiple contacts according to the edition instruction, and then the update module updates the information of the contacts edited by the control module in a database, thus updating information of multiple contacts once is achieved, the update operation is simplified and user experience is improved.

Figure 2:
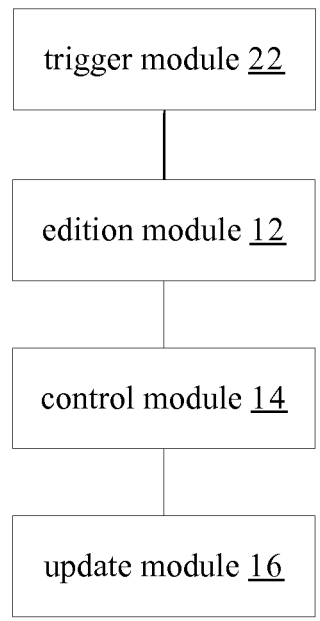
FIG. 2 is structural block diagram of the mobile terminal according to a preferred embodiment of the present invention.

FIG. 2 is structural block diagram of the mobile terminal according to a preferred embodiment of the present invention. Preferably, on the basis of the mobile terminal shown in FIG. 1, the mobile terminal further includes: a trigger module 22 which is configured to receive an instruction from the user and trigger the edition module to provide the contact update interface. This embodiment gives convenience to the user to start up or shut down the function of updating information of contacts in batch by newly adding the trigger module.

Preferably, the edition module is further configured to provide an interaction control in the contact update interface, wherein the interaction control is used for generating an instruction for reading call records according to an operation from the user; the control module is further configured to acquire information of contacts in the call records corresponding to the information of the contacts according to the instruction for reading the call records from the interaction control; and the edition module is further configured to provide the information of the contacts acquired by the control module in the contact update interface and set a selected function for the acquired information of the contacts.

This embodiment reaches the effect of acquiring, from the call records, information of multiple contacts to be updated once by taking the information of the contacts extracted from the call records as the updated information of the contacts.

Figure 3:
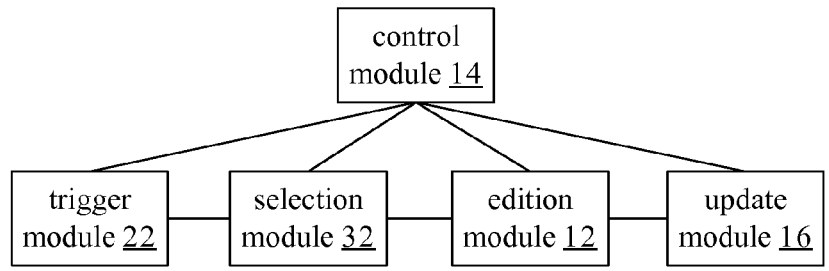
FIG. 3 is structural block diagram of the mobile terminal according to another preferred embodiment of the present invention.

FIG. 3 is structural block diagram of the mobile terminal according to another preferred embodiment of the present invention, and the mobile terminal includes the modules as follows. A trigger module 22 is configured to receive an instruction from the user and trigger the edition module to provide the contact update interface, i.e. activate the procedure of updating contacts in batch. A selection module 32 coupled to the trigger module 22 is configured to check contacts which need to be updated in a telephone book. The edition module 12 coupled to the selection module 32 is configured to construct a contact update interface, display information of the contacts and allow the user to edit. The update module 16 coupled to the selection module 32 is configured to read user input and update the information of the contacts stored in the database. The control module 14 coupled to the trigger module 22, selection module 32, edition module 12 and update module 16 is configured to schedule the trigger module 22, selection module 32, edition module 12 and update module 16 as required and edit the information of the contacts in batch according to the edition instruction from the edition module.

Figure 4:
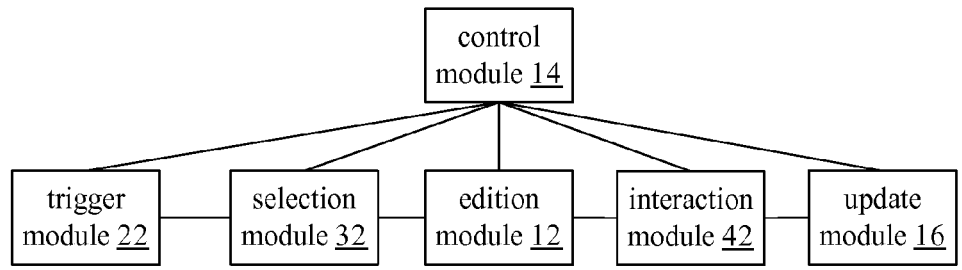
FIG. 4 is structural block diagram of the mobile terminal according to still another preferred embodiment of the present invention.

FIG. 4 is structural block diagram of the mobile terminal according to still another preferred embodiment of the present invention, and on the basis of the mobile terminal shown in FIG. 3, the mobile terminal further includes: an interaction module 42 coupled to the edition module 12 and the update module 16, configured to access applications such as call records and so on so as to acquire new telephone numbers of the contacts.

Preferably, the edition module is further configured to provide a mode control in the contact update interface, wherein the mode control is used for accepting the user to designate the number of contacts to be updated; and the control module is further configured to stop updating the information of the contacts when the number of the contacts whose information is updated is equal to the number of the contacts to be updated designated by the user.

In this embodiment, the mode control accepts the user to designate the number of contacts to be updated, and the updating of the information of the contacts is stopped when the number of contacts whose information is updated in batch is equal to the number of contacts to be updated designated by the user, thus improving the controllability of contact information updating.

Preferably, the database includes: an internal memory of the mobile terminal and/or a subscriber identity module (SIM) card.

Since the internal memory of the mobile terminal and/or the SIM card is a frequently-used storage area in the mobile terminal, this embodiment is capable of meeting most scenario applications.

Figure 5:
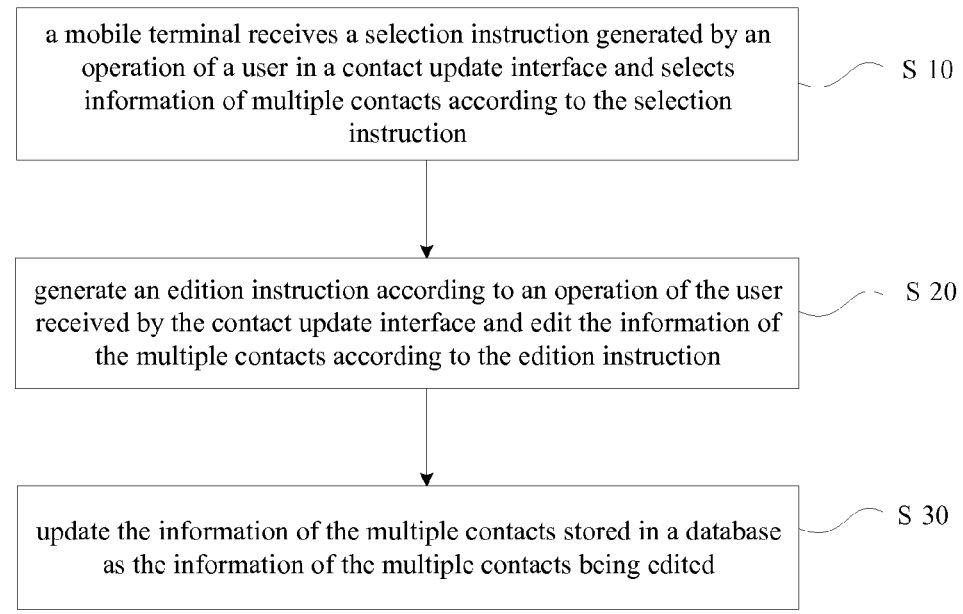
FIG. 5 is a flowchart of a method for updating information of contacts according to an embodiment of the present invention.

Corresponding to the above mobile terminal, an embodiment of the present invention further provides a method for updating information of contacts. FIG. 5 is a flowchart of a method for updating information of contacts according to an embodiment of the present invention, and the method includes:

Step S10: a mobile terminal receiving a selection instruction generated by an operation of a user in a contact update interface and selecting information of multiple contacts according to the selection instruction;

Step S20: generating an edition instruction according to an operation of the user received by the contact update interface and editing the information of the multiple contacts according to the edition instruction; and Step S30: updating information of the multiple contacts stored in a database as the edited information of the multiple contacts.

In the related art, only one number can be updated each time, however, in this embodiment, an operation of the user is received to generate a selection instruction or an edition instruction, the information of contacts are updated in batch according to the edition instruction, then the information of the multiple contacts stored in the database are updated as the information of the multiple contacts being updated, thus updating the information of multiple contacts once is achieved, the update operation is simplified, and user experience is improved.

Preferably, before the mobile terminal receives the selection instruction generated by an operation of the user in the contact update interface, the mobile terminal receives an instruction from the user and triggers itself to provide the contact update interface. This embodiment gives convenience to the user to start up or shut down the function of updating contacts in batch by newly adding a triggering step.

Preferably, after selecting information of the multiple contacts according to the selection instruction, the method further includes: the mobile terminal receiving a reading instruction generated by an operation of the user in the contact update interface; and acquiring information of contacts in call records corresponding to the information of the multiple contacts according to the reading instruction and providing the acquired information of the contacts to the user via the contact update interface so that the user edits the information of the multiple contacts according to the acquired information of the contacts.

This embodiment reaches the effect of acquiring, from the call records, information of multiple contacts to be updated once by taking the information of the contacts extracted from the call records as the updated information of the contacts.

Preferably, before the mobile terminal receives the selection instruction generated by an operation of the user in the contact update interface, the mobile terminal accepts the user to designate the number of contacts to be updated; and after updating information of the multiple contacts stored in a database as the edited information of the multiple contacts, stop updating the information of the contacts if it is judged that the number of the contacts whose information is updated is equal to the number of the contacts to be updated designated by the user.

According to this embodiment, the user is accepted to designate the number of contacts to be updated, and the updating of the information of the contacts is stopped when the number of contacts whose information is updated is equal to the number of contacts to be updated designated by the user, thus improving the controllability of contact information updating.

Figure 6:
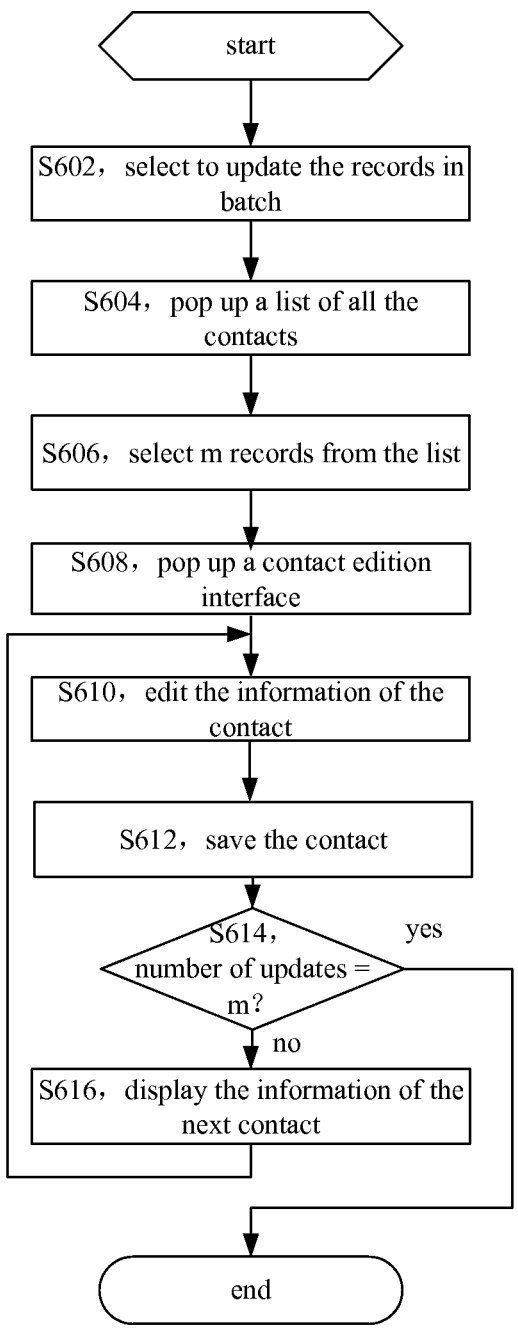
FIG. 6 is a flowchart of a method for updating records in batch according to a preferred embodiment of the present invention.

FIG. 6 is a flowchart of a method for updating records in batch according to a preferred embodiment of the present invention, and the method includes steps as follows.

Step S602: a user selects to update records in batch in the telephone book application and activates the procedure of updating contacts in batch.

Step S604: a list of all the contacts in the telephone book is popped up for the user to select.

Step S606: the user selects m records from the contact list popped up in step S604.

Step S608: a contact update interface is constructed and popped up, and the information of the first contact is displayed on the interface.

Step S610: the user edits the information of the contact and inputs a new contact way.

Step S612: the user saves the information of the contact and the database of the contacts in the telephone book is updated.

Step S614: it is judged whether the number of updated contacts has reached m, if it has not reached m, then perform step S616, and if it has reached m, then exit the procedure of updating in batch.

Step S616: each input area on the contact update interface is cleared, the information of the next contact is displayed, and steps S610 to S614 are repeatedly performed till the updating of all contacts is completed.

Preferably, the database includes: an internal memory of the mobile terminal and/or a subscriber identity module (SIM) card.

Since the internal memory of the mobile terminal and/or the SIM card is a frequently-used storage area in the mobile terminal, this embodiment is capable of meeting most scenario applications.

Figure 7:
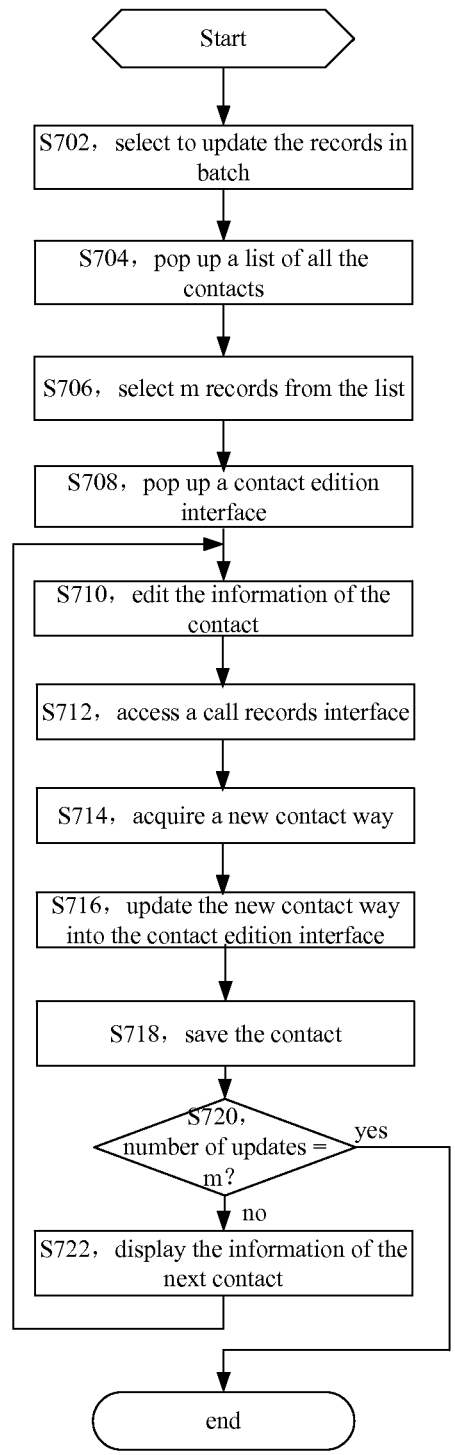
FIG. 7 is a flowchart of the method for updating records in batch according to another preferred embodiment of the present invention.

FIG. 7 is a flowchart of the method for updating records in batch according to another preferred embodiment of the present invention. In the procedure, the contact numbers in the call records application being updated in batch into the telephone book is used for description, but actually it is not limited to the call records application. The method includes:

Step S702: a user selects to update records in batch in the telephone book application and activates the procedure of updating contacts in batch.

Step S704: a list of all the contacts in the telephone book is popped up for the user to select.

Step S706: the user selects m records from the contact list popped up in step S704.

Step S708: a contact update interface is constructed and popped up, and the information of the first contact is displayed on the interface.

Step S710: the user edits the information of the contact.

Step S712: the call records application interface is accessed.

Step S714: a new number is acquired from the call records application interface described in step S712.

Step S716: the new number described in step S714 is displayed in a corresponding area in the contact update interface.

Step S718: the user saves the information of the contact and the database of the contacts in the telephone book is updated.

Step S720: it is judged whether the number of updated contacts has reached m, if it has not reached m, then perform step S722, and if it has reached m, then exit the procedure of updating in batch.

Step S722: each input area on the contact update interface is cleared, the information of the next contact is displayed, and steps S710 to S720 are repeatedly performed till the updating of all contacts is completed.

In summary, according to the embodiments of the present invention, the edition module provides a contact update interface to enable the user to update a plurality of contacts in the telephone book by only selecting the editing operation once and only calling the editing interface once, which reaches the effects of improving operation efficiency and improving user experience.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall include any medication, equivalent substitution and improvement within the spirit and principle of the present invention.

What is claimed is:

1. A mobile terminal, comprising:
    an edition module, configured to provide a contact update interface containing a selection control and an edition control, wherein the selection control is used for generating a selection instruction according to an operation from a user, and the edition control is used for generating an edition instruction according to an operation from the user;
    a control module, configured to select information of multiple contacts according to the selection instruction from the selection control and edit the selected information of the multiple contacts according to the edition instruction from the edition control; and
    an update module, configured to update information of the multiple contacts stored in a database as the selected information of the multiple contacts being edited by the control module;

wherein
    the edition module is further configured to provide an interaction control in the contact update interface, wherein the interaction control is used for generating an instruction for reading call records according to an operation from the user;
    the control module is further configured to acquire information of the multiple contacts in the call records corresponding to the information of the multiple contacts according to the instruction for reading the call records from the interaction control; and
    the edition module is further configured to provide the information of the contacts acquired by the control module in the contact update interface and set a selected function for the acquired information of the contacts.

2. The mobile terminal according to claim 1, wherein the mobile terminal further comprises:
    a trigger module, configured to receive an instruction from the user and trigger the edition module to provide the contact update interface.

3. The mobile terminal according to claim 1, wherein the edition module is further configured to provide a mode control in the contact update interface, wherein the mode control is used for accepting the user to designate a number of contacts to be updated; and the control module is further configured to stop updating the information of the multiple contacts when the number of the multiple contacts whose information is updated is equal to the number of the contacts to be updated designated by the user.

4. The mobile terminal according to claim 1, wherein the database comprises: an internal memory of the mobile terminal and/or a subscriber identity module (SIM) card.

5. A method for updating information of contacts, the method comprising:
    a mobile terminal receiving a selection instruction generated by an operation of a user in a contact update interface and selecting information of multiple contacts according to the selection instruction;
    generating, by a processor, an edition instruction according to an operation of the user received by the contact update interface and editing the selected information of the multiple contacts according to the edition instruction; and
    updating information of the multiple contacts stored in a database as the edited information of the multiple contacts;
    wherein after selecting information of the multiple contacts according to the selection instruction, the method further comprises:
        the mobile terminal receiving a reading instruction generated by an operation of the user in the contact update interface; and
        acquiring information of the multiple contacts in call records corresponding to the information of the multiple contacts according to the reading instruction and providing the acquired information of the contacts to the user via the contact update interface so that the user edits the information of the multiple contacts according to the acquired information of the contacts.

6. The method according to claim 4, wherein before the mobile terminal receives the selection instruction generated by an operation of the user in the contact update interface, the method further comprises:
    the mobile terminal receiving an instruction from the user and triggering the mobile terminal to provide the contact update interface.

7. The method according to claim 5, further comprising:
before the mobile terminal receives the selection instruction generated by an operation of the user in the contact update interface, the mobile terminal accepting the user to designate a number of contacts to be updated; and
after updating information of the multiple contacts stored in a database as the edited information of the multiple contacts, stopping updating the information of the contacts if it is judged that the number of the contacts whose information is updated is equal to the number of the contacts to be updated designated by the user.

8. The method according to claim 5, wherein the database comprises: an internal memory of the mobile terminal and/or a subscriber identity module (SIM) card.

9. The mobile terminal according to claim 2, wherein the database comprises: an internal memory of the mobile terminal and/or a subscriber identity module (SIM) card.

10. The mobile terminal according to claim 3, wherein the database comprises: an internal memory of the mobile terminal and/or a subscriber identity module (SIM) card.

11. The method according to claim 6, wherein the database comprises: an internal memory of the mobile terminal and/or a subscriber identity module (SIM) card.

12. The method according to claim 7, wherein the database comprises: an internal memory of the mobile terminal and/or a subscriber identity module (SIM) card.

* * * * *